(12) United States Patent
Metzler et al.

(10) Patent No.: US 8,676,827 B2
(45) Date of Patent: Mar. 18, 2014

(54) RARE QUERY EXPANSION BY WEB FEATURE MATCHING

(75) Inventors: Donald Metzler, Santa Clara, CA (US); Lance Riedel, Menlo Park, CA (US); Evgeniy Gabrilovich, Sunnyvale, CA (US); Vanja Josifovski, Los Gatos, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1044 days.

(21) Appl. No.: 12/365,551

(22) Filed: Feb. 4, 2009

(65) Prior Publication Data

US 2010/0198857 A1 Aug. 5, 2010

(51) Int. Cl.
*G06F 17/30* (2006.01)
*G06Q 30/00* (2012.01)

(52) U.S. Cl.
USPC ............................ 707/765; 707/708; 705/14.4

(58) Field of Classification Search
USPC ...................... 707/5, 765, 768, 708; 705/14.4
See application file for complete search history.

(56) References Cited

U.S. PATENT DOCUMENTS

| | | | |
|---|---|---|---|
| 5,404,507 A | | 4/1995 | Bohm et al. |
| 6,006,225 A | | 12/1999 | Bowman et al. |
| 6,021,411 A | | 2/2000 | Brophy et al. |
| 6,665,666 B1 | * | 12/2003 | Brown et al. ..................... 707/5 |
| 6,704,727 B1 | | 3/2004 | Kravets |
| 7,266,551 B2 | | 9/2007 | Kravets |
| 7,774,333 B2 | * | 8/2010 | Colledge et al. .............. 707/708 |
| 2006/0047636 A1 | * | 3/2006 | Mohania et al. .................. 707/3 |
| 2007/0016473 A1 | * | 1/2007 | Anderson et al. ............... 705/14 |

OTHER PUBLICATIONS

"Optimizing Relevance and Revenue in Ad Search: A Query Substitution Approach", by: Filip Radlinski, Published Jul. 2008 http://www.cs.technion.ac.il/~gabr/publications/papers/Radlinski2008ORR.pdf.*
Anick, Peter, *Using Terminological Feedback for Web Search Refinement—A Log-based Study*, SIGIR '03, Toronto, Canada, 8 pages (Jul. 28-Aug. 1, 2003).
Baeza-Yates, Ricardo, et al., Chapter 1: Introduction, *Modern Information Retrieval*, England, ACM Press, 39 pages (1999).
Billerbeck, Bodo, et al., *Query Expansion using Associated Queries*, Conference on Information and Knowledge Management, Proceedings of the Twelfth International Conference on Information and Knowledge Management, New Orleans, LA, 11 pages (2003).

(Continued)

*Primary Examiner* — Cam-Linh Nguyen
*Assistant Examiner* — Chelcie Daye
(74) *Attorney, Agent, or Firm* — Nathan O. Greene; Brinks Gilson & Lione

(57) ABSTRACT

A method is disclosed for expansion of rare queries to improve advertisement results, including receiving a query from a user by a search engine; determining that the query does not match an entry in an ad query lookup table coupled with the search engine; retrieving one or more expanded queries located within a query feature index whose features relate to one or more features of the received query, wherein the query feature index includes a plurality of queries expanded based on at least corresponding search results; generating, in real time and by the search engine, an ad query including an expanded version of the received query based on features of the retrieved expanded queries; and selecting one or more advertisements based on the generated ad query, wherein the one or more advertisements are displayed to the user in response to the query received from the user.

25 Claims, 6 Drawing Sheets

(56) References Cited

OTHER PUBLICATIONS

Broder, Andrei, et al., *A Semantic Approach to Contextual Advertising*, SIGIR '07, Amsterdam, The Netherlands, pp. 559-566 (Jul. 23-27, 2007).
Broder, Andrei, et al., *Search Advertising using Web Relevance Feedback*, Conference on Information and Knowledge Management, Proceeding of the 17th ACM conference on Information and knowledge management, Napa Valley, California, 10 pages (2008).
Broder, Andrei, et al., *To Swing or not to Swing: Learning when (not) to Advertise*, Conference on Information and Knowledge Management, Proceeding of the 17th ACM Conference on Information and Knowledge Management, Napa Valley, California, 10 pages (2008).
Cucerzan, Silviu, et al., *Spelling correction as an iterative process that exploits the collective knowledge of web users*, Proceedings of EMNLP, retrieved Feb. 3, 2009, from http://acl.ldc.upenn.edu/acl2004/emnlp/pdf/Cucerzan.pdf, 8 pages (2004).
Cui, Hang, et al., *Probabilistic Query Expansion using Query Logs*, WWW 2002, Honolulu Hawaii, 8 pages (May 7-11, 2002).
Deerwester, Scott, et al., *Indexing by Latent Semantic Analysis*, Journal of the American Society for Information Science, 41(6):391-407 (1990).
Diaz, Fernanco, et al., *Improving the Estimation of Relevance Models Using Large External Corpora*, SIGIR '06, Seattle, Washington, 8 pages (Aug. 6-11, 2006).
Edelman, Benjamin, et al., *Internet Advertising and the Generalized Second-Price Auction: Selling Billions of Dollars Worth of Keywords*, The American Economic Review, 97(1):242-259 (Mar. 2007).
Järvelin, Kalervo, et al., *Cumulated Gain-based Evaluation of IR Techniques*, ACM Transactions on Information Systems, 20(4):422-446 (Oct. 2002).
Jones, Rosie, et al., *Generating Query Substitutions*, WWW 2006, Edinburgh, Scotland, 10 pages (May 23-26, 2006).
Jones, Rosie, et al., *Query Word Deletion Prediction*, SIGIR '03, Toronto, Canada, 2 pages (Jul. 28-Aug. 1, 2003).
Krovetz, Robert, *Viewing Morphology as an Inference Process*, retrieved Feb. 4, 2009, from http://historical.ncstrl.org/tr/ps/umass_cs/UM-CS-1993-036.ps, 12 pages (1993).
Lavrenko, Victor, et al., *Relevance-Based Language Models*, SIGIR '01, New Orleans, Louisiana, USA, 8 pages (Sep. 9-12, 2001).
Mitra, Mandar, et al., *Improving Automatic Query Expansion*, Annual ACM Conference on Research and Development in Information Retrieval, Proceedings of the 21st annual international ACM SIGIR conference on Research and development in information retrieval, 15 pages (1998.).
Peng, Fuchun, et al., *Context Sensitive Stemming for Web Search*, SIGIR '07, Amsterdam, The Netherlands, pp. 639-646 (Jul. 23-27, 2007).
Porter, M.F., *An algorithm for suffix stripping*, Program 14(3):130-137 (Jul. 1980).
Radlinski, Filip, et al., *Optimizing Relevance and Revenue in Ad Search: A Query Substitution Approach*, SIGIR '08, Singapore, 8 pages (Jul. 20-24, 2008).
Ribeiro-Neto, Bertheir, et al., *Impedance Coupling in Content-targeted Advertising*, SIGIR '05, Salvador, Brazil, 8 pages (Aug. 15-19, 2005).
Robertson, S.E., et al., *Okapi at TREC-3*, In Proceedings of the Third Text Retrieval Conference (TREC-3), D. K. Harman, Ed. 109-126 (1995).
Robertson, S.E., et al., *Some Simple Effective Approximations to the 2-Poisson Model for Probabilistic Weighted Retrieval*, Annual ACM Conference on Research and Development in Information Retrieval, Proceedings of the 17th annual international ACM SIGIR conference on Research and development in information retrieval, pp. 232-241 (1994).
Robertson, Stephen, et al., *Simple BM25 Extension to Multiple Weighted Fields*, CIKM '04, Washington, DC, USA, 8 pages (Nov. 8-13, 2004).
Sahami, Mehran, et al. *A Web-based Kernel Function for Matching Short Text Snippets*, W4: Learning in Web Search, at the $22^{nd}$ International Conference on Machine Learning, Bonn, Germany, 8 pages (2005).
Spink, Amanda, et al., *Searching the Web: The Public and Their Queries*, Journal of the American Society for Information Science and Technology 52(3):226-234 (2001).
Voorhees, Ellen M., *Query Expansion using Lexical-Semantic Relations*, Annual ACM Conference on Research and Development in Information Retrieval, Proceedings of the 17th annual international ACM SIGIR conference on Research and development in information retrieval, Dublin, Ireland, pp. 61-69 (1994).
Wang, Chingning, et al., *Understanding Consumers Attitude Toward Advertising*, Eighth Americas Conference on Information Systems, pp. 1143-1148 (2002).
Xu, Jinxi, et al., *Improving the Effectiveness of Information Retrieval with Local Context Analysis*, ACM Transactions on Information Systems 18(1):79-112 (Jan. 2000).
Zhai, Chengxiang, et al., *Model-based Feedback in the Language Modeling Approach to Information Retrieval*, Proceedings of the Tenth International Conference on Information and Knowledge Management, Atlanta, Georgia, USA, 8 pages (Oct. 5-10, 2001).

\* cited by examiner

RARE QUERY EXPANSION BY WEB FEATURE MATCHING

CROSS REFERENCE TO RELATED APPLICATIONS

This application is related to the following pending applications, each of which is hereby incorporated herein by reference:

U.S. patent Ser. No. 12/056,703, entitled "SYSTEM AND METHOD FOR QUERY SUBSTITUTION FOR SPONSORED SEARCH," filed Mar. 27, 2008.

U.S. patent application Ser. No. 12/062,271, entitled "AD MATCHING BY AUGMENTING A SEARCH QUERY WITH KNOWLEDGE OBTAINED THROUGH SEARCH ENGINE RESULTS," filed Apr. 3, 2008.

U.S. patent application Ser. No. 12/169,782, entitled "SYSTEMS AND METHODS FOR QUERY EXPANSION IN SPONSORED SEARCH," filed Jul. 9, 2008.

BACKGROUND

1. Technical Field

The disclosed embodiments relate to the writing of web search queries in sponsored search, and more particularly, to the online expansion of a rare query by correlating features of the rare query to features of expanded queries from web and search resources related to more popular queries.

2. Related Art

The explosive growth of the Internet as a publication and interactive communication platform has created an electronic environment that is changing the way business is transacted. As the Internet becomes increasingly accessible around the world, users need efficient tools to navigate the Internet and to find content available on various websites.

Search engines provide a gateway to the World Wide Web ("Web") for most Internet users. They also support the Web ecosystem by providing much needed traffic to many websites. Each query submitted to a commercial search engine such as Yahoo! or Google results in two searches. The first search is over the corpus of web pages crawled by the search engine. The web crawl performed by the search engine can be viewed as a pull mechanism used to obtain documents. The second search is over the corpus of advertisements provided to the search engine through an interface or a feed from advertisers. This can be viewed as a search over pushed content.

The ad search provides traffic to (mostly) commercial websites that might otherwise not show up in the top web search results for the query. Since advertisers pay for the placement of their ads on the result page, the search of the ad space is commonly called sponsored search. Two main scenarios of sponsored search advertising are exact match, where advertisers specify the exact query (bid phrase) for which the ad is to be shown, and broad match where queries are matched against ads using a broader criterion. This typically includes matching the query against the ad text, target website (landing page), or other information related to the user, ad, or advertiser.

The volume distribution of web search queries follows the power law. That is, the most frequent queries compose the head and torso of the curve, while the low volume, rarer queries make up the tail of the curve. While individually rare, tail queries make up a significant portion of the query volume. For this reason, tail queries have significant potential for advertising revenue.

Web search engines return results for most queries, including those in the tail of the curve. This is not, however, the case for sponsored search. Evaluation of two major search engines has shown that only about 30%-40% of the query volume is covered by ad results. The main reason for this is that tail queries are harder to interpret. In most cases there are no ads that are explicitly associated with them by advertisers who specifically bid on the query. Furthermore, ad matching based on analyzing historical click data is also difficult, since due to the low volume it is harder to accumulate enough ad clicks to use statistical and explore-exploit methods to identify good ads. Search engines normally avoid displaying irrelevant ads in order not to degrade user experience so the current practice is not to advertise on most of the tail queries, which means failure to capitalize on advertising dollars for at least half of all search queries.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION

Figure 1:
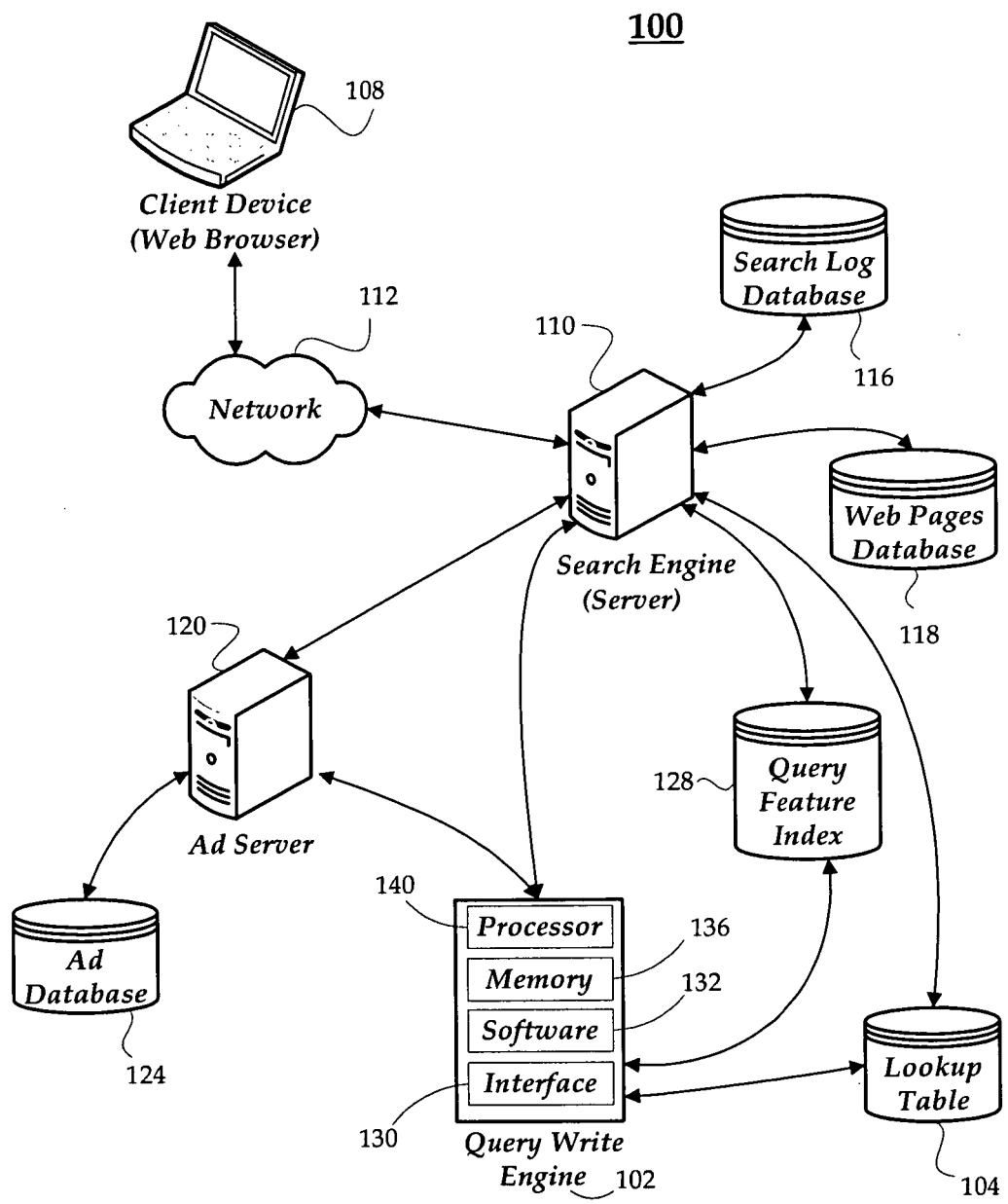
FIG. 1 is a block diagram of an exemplary network system for expanding rare search queries.

By way of introduction, included below is a system and method for query writing in sponsored search, and specifically, to expansion or revision of rare queries. Substitute queries or query rewrites may be generated and used to maximize advertising revenue. A large number of head and torso queries may be pre-processed offline by expanding them with features extracted from web search results, for instance, and stored in a lookup table. To "expand" a query is a term known in the art, which includes any sort of revision of that query like fixing a misspelling, up to and including completely re-writing the query some or all different terms to enhance its ability to produce relevant search results. Such expanded queries can be effectively used to produce query rewrites for broad match. At runtime—upon receipt of a search query—the lookup table is searched for the search query; if it is found, the expanded query is used to search an advertising ("ad") space (or ad corpus).

While this approach is efficient for head and torso queries, tail queries are too rare and cannot be expanded ahead of time. Expanding them online with web results would require the sponsored search to wait for the web search to finish prior to performing ad selection, which in many cases would result in unacceptable latency. To overcome this, data of the pre-processed queries may be used differently. Instead of an exact match lookup, an inverted index—variably referred to herein as query feature index—is built out of expanded query vectors, where each "document" represents a commercial query and its features. At runtime, when the direct lookup into the query table fails, the query feature index is used to perform a similarity search between the user's query and the pre-processed queries. The features of the top k most similar queries are returned by this procedure to construct an enriched ad query, which is then used to search over the ad space. The process by which the enriched, or expanded, ad query is generated will be discussed in detail.

Other systems, methods, features and advantages will be, or will become, apparent to one with skill in the art upon examination of the following figures and detailed description. It is intended that all such additional systems, methods, features and advantages be included within this description, be within the scope of the disclosure, and be protected by the following claims. Nothing in this section should be taken as a limitation on those claims. Further aspects and advantages are discussed below.

Sponsored search is usually used as a form of direct marketing, as opposed to brand advertising that seeks to promote brand awareness in general. Direct marketing advertising aims for a "direct response," where the effect of a campaign can be measured by the user reaction, which may include purchasing advertised goods and services. One of the advantages of online advertising, compared to traditional media, is that it is relatively easy to measure user response. The desired reaction to a sponsored search advertisement is for the user to click on the ad and follow the link to the advertiser's website.

When a user clicks an advertisement, the advertiser pays a certain amount of money. This is known as the pay-per-click (PPC) pricing model. Other pricing models exist, including pay-per-impression, where an advertiser pays every time their ad is displayed, and pay-per-action (PPA), where advertisers only pay if the ad results in a sale or similar type of transaction. While studies associated with this disclosure assume a PPC model, the pricing model does not directly affect the usefulness of the underlying methods disclosed herein, which may be used with differing pricing models.

The amount paid by the advertiser for each click is typically determined by an auction process. Advertisers place bids on a search phrase, and their position on the search result page is determined by their own bid as well as the bids of other advertisers. Each sponsored search ad has one or more bid phrases associated with it. In addition to bid phrases, ads also have a title usually displayed in bold font, and an abstract or creative, which is the few lines of text, usually shorter than 120 characters, displayed on the page. Each ad also contains a uniform resource locator (URL) to the advertised web page, which is called the landing page.

The set of all the ads available in the system can be viewed as structured hierarchically. Each advertiser has one or more accounts, which in turn have several ad campaigns that usually aggregate ads in the same promotional campaign. Each campaign may have several ad groups, which cluster a smaller number of similar ads. Each ad group is composed of an ad creative, which is the visible part of the ad displayed to the user, and of one or more bid phrases associated with the ad.

Bid phrases serve two purposes. First, they explicitly specify queries that the ad should be displayed for. Second, they put a price tag on a click event. These price tags could be different for different queries. For example, a contractor advertising his services on the Internet may be willing to pay very little when his ads are clicked from general queries such as "remodeling." However, the contractor may be willing to pay more for focused queries such as "hardwood floors" or "laminate flooring." Ads are most often shown for queries that are listed among the bid phrases for the ad, thus resulting in an exact match between the query and the bid phrase. However, it might be difficult, or even impossible, for the advertiser to explicitly list all the relevant queries ahead of time. For this reason, search engines also have the ability to analyze, and slightly modify queries in an attempt to match the pre-defined bid phrases. This approach, which is called broad or advanced match, allows more flexible matching of queries to ads, but can be error-prone, which is why not all advertisers opt to use it. Broad match will be the focus herein.

FIG. 1 provides a view of a network system 100 in which the present system and methods may be implemented. Not all of the depicted components may be required, however, and some systems may include additional, different, or fewer components not shown in FIG. 1 may be provided. Variations in the arrangement and type of the components may be made without departing from the spirit or scope of the claims as set forth herein.

FIG. 1 is a block diagram illustrating an exemplary network system 100 for expanding rare search queries. In particular, the system 100 includes a query write engine 102 that may generate a mapping of queries with bid phrases and query logs that is stored as a lookup table 104. A client device 108 is coupled with a search engine 110 through a network 112. The search engine 110 may be coupled with a search log database 116, a web pages database 118, the lookup table 104 and/or the query write engine 102. An ad server 120 may be coupled with the search engine 110, the query write engine 102, and/or an ad database 124. Herein, the phrase "coupled with" may mean directly connected to or indirectly connected through one or more intermediate components. Such intermediate components may include both hardware and software based components.

A query feature—or inverted—index 128 may be coupled with the query write engine 102. The query feature index 128 and other databases referred to herein may be stored in data storage (or memory) of the network system 100, e.g., in computer readable medium accessible by computer processing. The databases stored in the data storage may be distributed across a variety of separate data storage devices, such as hard disk drives and/or memory, or may be combined into a single data storage of the search engine 110. Indeed, the ad server 120 and the query write engine 102 with their respective databases may be combined as a part of the search engine 110 in one embodiment.

The client device 108 may be a computing device for a user to connect to the network 112, such as the Internet. Examples of a user device include but are not limited to a personal computer, personal digital assistant ("PDA"), cellular phone, or other electronic device. The client device 108 may be configured to access other data/information in addition to web pages over the network 112 with a web browser, such as INTERNET EXPLORER (sold by Microsoft Corp., Redmond, Wash.). The client device 108 may enable a user to view pages over the network 112, such as the Internet.

The client device 108 may be configured to allow a user to interact with the search engine 110, ad server 120, query write engine 102, or other components of the system 100. The client device 108 may receive and display a site or page provided by the search engine 110, such as a search page or a page with search results. The client device 108 may include a keyboard, keypad or a cursor control device, such as a mouse, or a joystick, touch screen display, remote control or any other device operative to allow a user to interact with the page(s) provided by the search engine 110 and/or the ad server 120.

The search engine 110 is coupled with the client device 108 through the network 112, as well as being coupled with the search log database 116, the query write engine 102, the ad server 120 and/or the lookup table 104. The search engine 110 may be a web server. The search engine 110 may provide a site or a page from the web pages database 118, over a network, such as the network 112 or the Internet. A site or page may refer to a web page or web pages that may be received or viewed over the network 112. The site or page is not limited to a web page, and may include any information accessible over a network that may be displayed at the client device 108. A site may refer to a series of pages which are linked by a site map. For example, the web site operated by Yahoo! Inc., of Sunnyvale, Calif., may include thousands of pages, which are included at yahoo.com. Hereinafter, a page will be described as a web page, a web site, or any other site/page accessible over a network. A user of the client device 108 may access a page provided by the search engine 110 over the network 112. As described below, the page provided by the search engine 110 may be a search page that receives a search query from the client device 108 and provides search results that are based on the received search query and may include advertisements associated with the search query.

The search engine 110 may include an interface, such as a web page, e.g., the web page which may be accessed on the Web at yahoo.com, which is used to search for pages which are accessible via the network 112. The client device 108, autonomously or at the direction of the user, may input a search query (also referred to as a user query, original query, search term or a search keyword) for the search engine 110. A single search query may include multiple words or phrases. The search engine 110 may perform a search for the search query and display the results of the search on the client device 108. The results of a search may include a listing of related pages or sites that is provided by the search engine 110 in response to receiving the search query.

The ad server 120 is coupled with the search engine 110, the ad database 124 and/or the query write engine 102. The ad server 120 may be configured to provide advertisements to the search engine 110. Alternatively, the search engine 110 and the ad server 120 may be a common component and/or the search engine 110 may select and provide advertisements. The ad server 120 may include or be coupled with the advertisement database 124, which includes advertisements that are available to be displayed by the search engine 110 for sponsored searching. The ad server 120 may be configured to transmit and receive content including advertisements, sponsored links, integrated links, and/or other types of advertising content to and from the search engine 110, the ad database 124, and/or the client device 108.

Furthermore, a search query may be received and associated bid phrases may be identified as in broad match. In other words, a search query may be rewritten or substituted with a bid phrase or expanded query, so that the bid phrase is a query rewrite of the original user query. Alternatively, other input may be received for which a query write is selected. The input may include an original query or other information. As described, the input is a query and the query write is a query rewrite that is a potential substitute query for the original query. The ad server 120 may select and provide advertisements to the search engine 110 based on the substituted query rewrite or bid phrase.

Other network entities may also access the search engine 110 and/or the query write engine 102 via the network 112, such as, for example, publisher entities (not shown), which may communicate with a web server (such as the search engine 110) to populate web pages transmitted by the server with appropriate content information, and advertiser entities (not shown), which may communicate with the web server (such as the search engine 110) and/or the ad server 120 to transmit advertisements to be displayed in the web pages requested by the user as the client device 108. The advertiser entity may operate the ad server 120 and the ad database 124. The ad server 120 and the ad database 124 may include ads from a variety of advertisers or advertiser entities.

The search log database 116 includes records or logs of at least a subset of the search queries entered in the search engine 110 over a period of time and may also be referred to as a search query log, search term database, keyword database, bid phrase database or query database. The search log database 116 may store the bid phrases that are used by the ad server 120 in selecting an advertisement for a particular search query. The search log database 116 may also store a history of past queries which may be utilized by the query write engine 102 for generating a mapping between queries and bid phrases. The search log database 116 may include associations between bid phrases and advertisements provided by the ad server 110. Alternatively, the ad database 124 may store associations between bid phrases and advertisements. The search log database 116 may include or be coupled with the ad database 124 that includes advertisements provided to the search engine 110. The bid phrases may be chosen by advertisers and stored in the ad database 124 with their associated ads. The search log database 116 may include search queries from any number of users over any period of time.

The lookup table 104 may include a mapping that associates a plurality of search queries with bid phrases or queries found in query logs. The entries (or keys) within the lookup table 104 may include the top most frequent queries from query logs such as pulled from the search log database 116. For instance, the 10 million most frequently-submitted queries may be included as entries. Added to those entries within the lookup table 104 may include bid phrases from the ad database 124 that are not already in the lookup table by virtue of the query logs.

The lookup table 104 may be coupled with the query write engine 102 and the search engine 110. Alternatively, the lookup table 104 may be stored in the search log database 116. Search queries may be associated with or mapped to bid phrases, such that when a user searches for a particular search query, the mapped or associated bid phrase may be used in selecting search results and/or advertisements in response to that particular search query. The bid phrases stored in the lookup table 104 may be query rewrites for the original user queries in the mapping. Accordingly, the search engine 110 may utilize the lookup table 104 for identifying a query rewrite for a received user query, which may be used as a substitute query.

The query feature (or inverted) index 128 may be used to provide information to the query write engine 102 and/or the search engine 110 for purposes of query expansion in the context of rare (or tail) queries. The query feature index 128 is populated with large numbers of queries expanded based on corresponding web search results, query log sessions, and/or click log features. The population of the query feature index 128 will be discussed with reference to FIGS. 2 and 5-6. A query expansion may be a substitute query for a given query. After the search engine 110 determines that a user query has no match or possible rewrite in the lookup table 104, the search engine 110 may determine that the user query is a rare query. Upon determining that the query is rare, the search engine 110 may search the query feature index 128 for features of expanded queries matching features of the user query, as will be explained in more detail. The top k matching queries may then be used to generate an ad query that is an expanded version of the user-submitted query.

The search engine 110, the ad server 120, and/or the lookup table 104 may be coupled with the query write engine 102. The query write engine 102 may include an interface 130, software 132, memory 132, and a processor 140. The query write engine 102 may be a separate component from the search engine 110, the ad server 120, and/or the lookup table 104. Alternatively, any of the query write engine 102, the search engine 110, the ad server 120, and/or the lookup table 104 may be combined as a single component or device. The interface 130 may communicate with any of the search engine 110, the ad server 120, the lookup table 104, and/or the search log database 116. The interface 130 may include a user interface configured to allow a user to interact with any of the components of the query write engine 102. For example, a user may be able to modify the mapping stored in the lookup table 104 and/or modify ad associations between bid phrases and ads that are used by the query write engine 102.

The processor 140 in the query write engine 102 may include a central processing unit (CPU), a graphics processing unit (GPU), a digital signal processor (DSP) or other type of processing device. The processor 140 may be a component in any one of a variety of systems. For example, the processor 140 may be part of a standard personal computer or a workstation. The processor 140 may be one or more general processors, digital signal processors, application specific integrated circuits, field programmable gate arrays, servers, networks, digital circuits, analog circuits, combinations thereof, or other now known or later developed devices for analyzing and processing data. The processor 140 may operate in conjunction with a software program, such as code generated manually (i.e., programmed).

The processor 140 may be coupled with a memory 136, or the memory 136 may be a separate component. The interface 130 and/or the software 132 may be stored in the memory 136. The memory 136 may include, but is not limited to computer readable storage media such as various types of volatile and non-volatile storage media, including to random access memory, read-only memory, programmable read-only memory, electrically programmable read-only memory, electrically erasable read-only memory, flash memory, magnetic tape or disk, optical media and the like. The memory 136 may include a random access memory for the processor 140. Alternatively, the memory 136 may be separate from the processor 140, such as a cache memory of a processor, the system memory, or other memory. The memory 136 may be an external storage device or database for storing recorded image data. Examples include a hard drive, compact disc ("CD"), digital video disc ("DVD"), memory card, memory stick, floppy disc, universal serial bus ("USB") memory device, or any other device operative to store image data. The memory 136 is operable to store instructions executable by the processor 140.

The functions, acts or tasks illustrated in the Figures or described herein may be performed by the programmed processor executing the instructions stored in the memory 136. The functions, acts or tasks are independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like. The processor 140 is configured to execute the software 132. The software 132 may include instructions for generating a mapping that is used for query rewriting for improved sponsored searching.

The interface 130 may be a user input device or a display. The interface 130 may include a keyboard, keypad or a cursor control device, such as a mouse, or a joystick, touch screen display, remote control or any other device operative to interact with the query write engine 102. The interface 130 may include a display coupled with the processor 140 and configured to display an output from the processor 140. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 140, or as an interface with the software 132 for providing input parameters. In particular, the interface 130 may allow a user to interact with the query write engine 102 to view or modify the generation of the query mapping or expansion.

Any of the components in the system 100 may be coupled with one another through a network, such as network 112. Any of the components in the system 100 may include communication ports configured to connect with a network. The present disclosure contemplates a computer-readable medium that includes instructions or receives and executes instructions responsive to a propagated signal, so that a device connected to a network can communicate voice, video, audio, images or any other data over a network. The instructions may be transmitted or received over the network via a communication port or may be a separate component. The communication port may be created in software or may be a physical connection in hardware. The communication port may be configured to connect with a network, external media, display, or any other components in the system 100, or combinations thereof. The connection with the network may be a physical connection, such as a wired Ethernet connection or may be established wirelessly as discussed below. Likewise, the connections with other components of the system 100 may be physical connections or may be established wirelessly.

The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or a WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another. For example, the ad server 120 or the search engine 110 may provide pages to the client device 108 over a network, such as the network 112.

The ad server 120, the ad database 124, the search engine 110, the search log database 116, the web pages database 118, the query write engine 102, the lookup table 104, and/or the client device 108 may represent computing devices of various kinds. Such computing devices may generally include any device that is configured to perform computation and that is capable of sending and receiving data communications by way of one or more wired and/or wireless communication interfaces. Such devices may be configured to communicate in accordance with any of a variety of network protocols, as discussed above. For example, the client device 108 may be configured to execute a browser application that employs HTTP to request information, such as a web page, from the search engine 110 or ad server 120. The present disclosure contemplates a computer-readable medium that includes instructions or receives and executes instructions responsive to a propagated signal, so that any device connected to a network can communicate voice, video, audio, images or any other data over a network.

The query write engine 102 may be a computing device for analyzing queries and generating a mapping with bid phrases and most frequent queries stored in the lookup table 104 described above. The generation of such a mapping may be based on an analysis of search histories stored in the search log database 116. The query write engine 102 may also be used to build the query feature index 128 by indexing expanded queries as explained below.

Figure 2:
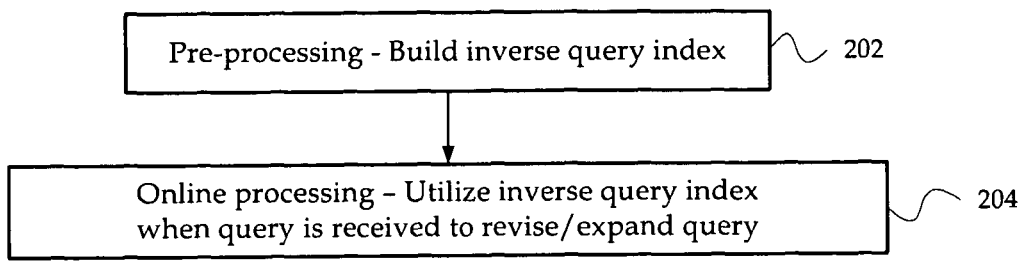
FIG. 2 is a flow diagram of (offline) pre-processing and online processing to enable the expansion or revision of the received rare query.

FIG. 2 is a flow diagram of (offline) pre-processing and online processing to enable the expansion or revision of the received rare query. In block 202, the query write engine 102 builds the inverse query index 128 by pre-processing. The offline processing by the write engine 102 pre-computes query expansions for a large number of queries, and then builds the inverted (or query feature) index 128 from the expanded query features. The index 128 maps features of expanded queries into the queries they characterize.

Approximately 100 million queries were selected from a web search log, such as the search log database 116, to process offline. The selection of queries was performed based on query volume and how often the query is bid on in the ad database 124 of sponsored search advertisements. Each selected query was expanded using search results, query logs, and click logs as sources of external knowledge. The general approach to query expansion using web search results has been published. A. Broder, P. Ciccolo, M. Fontoura, E. Gabrilovich, V. Josifovski, and L. Riedel., "Search advertising using web relevance feedback," *Proc* 17*th. Intl. Conf on Information and Knowledge Management,* 2008. The top-scoring web search results for each query are retrieved and features extracted from the individual result pages. The most salient features are selected based on the frequency in the result set. In addition to use of the web search results, also used were query rewrites generated based on information from query log sessions as another source of features. The rewrites are selected based on the approach described in R. Jones, B. Rey, O. Madani, and W. Greiner, "Generating query substitutions," *Proc.* 15*th Intl. Conf on World Wide Web*, pages 387-396, New York, N.Y., 2006 (ACM).

In block 204, the query feature index 128 may be utilized when a query is received in the online phase, in real time, to provide an expanded query as a substitute to the received query. The online processing may occur when a query is received by the search engine 110, which provides results/ads relatively quickly. When the query is received, the search engine 110 first checks to see if it is present in the lookup table 104. If it is, the corresponding expanded query is retrieved and a matching ad is retrieved. If the query has not been pre-processed offline such as to be missing in the lookup table 104, then a direct comparison with the ad database 124 is not likely to be efficient or successful. This is due to a vocabulary mismatch problem discussed in the literature. B. Ribeiro-Neto, M. Cristo, P. B. Golgher, and E. S. de Moura, "Impedance coupling in content-targeted advertising," *In SIGIR '05*, 2005.

Figure 5:
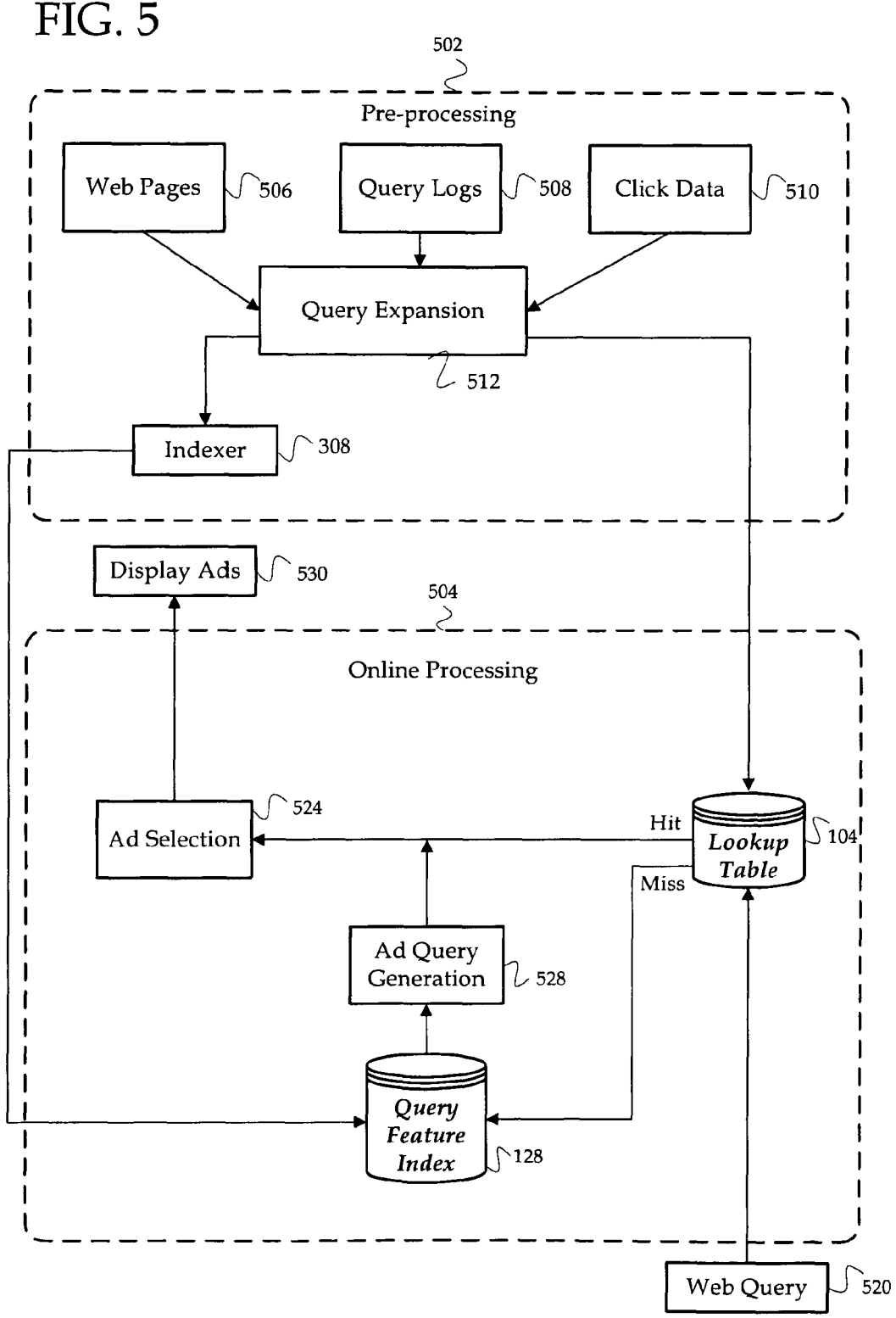
FIG. 5 is a flow diagram showing the flow of data through the system of FIG. 1 as per (offline) pre-processing and online processing to enable expansion of the received rare query.

Accordingly, the incoming query is first run against the query feature index 128 of expanded queries and the top k expanded queries are retrieved. The search engine 110 then processes the retrieved queries to generate an ad query, which is subsequently used to retrieve ads. This results in an expanded version of the original query, even though it has not been explicitly pre-processed offline. This ad query is then passed to an ad selection sub-system to retrieve a set of ads (FIG. 5). As discussed below, this computationally-efficient expansion process can significantly improve ad quality for rare queries.

Figure 3:
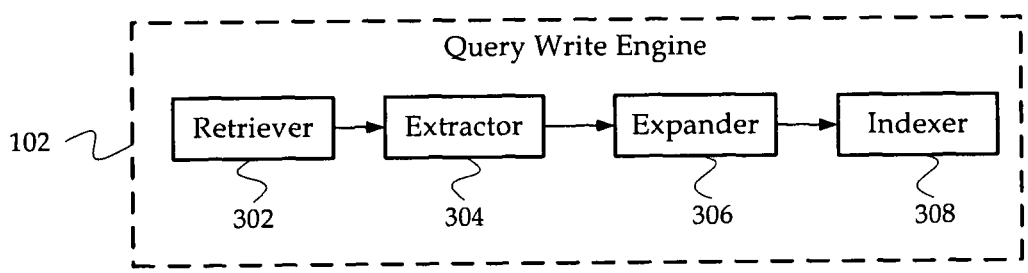
FIG. 3 is block diagram of a query write engine.

FIG. 3 is block diagram of the query write engine 102. The query write engine 102 may generate the indexing stored in the query feature index 128. The query write engine 102 may include a retriever 302, an extractor 304, an expanded 306, and an indexer 308. The retriever 302 may retrieve a large number of various queries, for instance from the search log database 116. The extractor 302 may be used to extract features from the large number of queries. The expander 306 may then expand the retrieved queries based on the more salient or important of the extracted features. The indexer 306 may then be used to index those salient features to corresponding expanded queries.

In order to obtain an expressive query representation, three different types of features are extracted from each query, including unigrams, bigrams or phrases, and semantic classes. For unigrams, terms are stemmed and a small set of stop words are dropped. Phrases are extracted using a phrase dictionary that consists of approximately 10 million statistical phrases gathered from query logs and web pages. While unigram and phrase features represent a query's syntax, they fail to accurately represent its semantics. Therefore, a set of semantic classes are also extracted from each query. This is done by classifying each query into a large hierarchical taxonomy of semantic classes. The taxonomy consists of about 6,000 nodes and has a median depth of five (5). Each query is annotated with its five most likely semantic classes within the hierarchy, although fewer or more semantic classes may be extracted.

TABLE 1

| Query: low sodium tomato soup recipes | | |
|---|---|---|
| Unigrams | Phrases | Classes |
| low | low sodium | health |
| sodium | tomato soup | health/diet |
| tomato | soup recipe | health/diet/recipe |
| soup | | cooking |
| recipe | | cooking/soup |

Table 1 shows an example of the features that may be extracted for the query "low sodium tomato soup recipes." Five unigram features are extracted corresponding to the query terms. Three phrase features corresponding to the phrases "low sodium," "tomato soup," and "soup recipe" are also extracted. Finally, five semantic classes, mostly related to health and cooking, are extracted. These features then become the entries (or keys) in the query feature index 128 to which are mapped the query terms.

Figure 4:
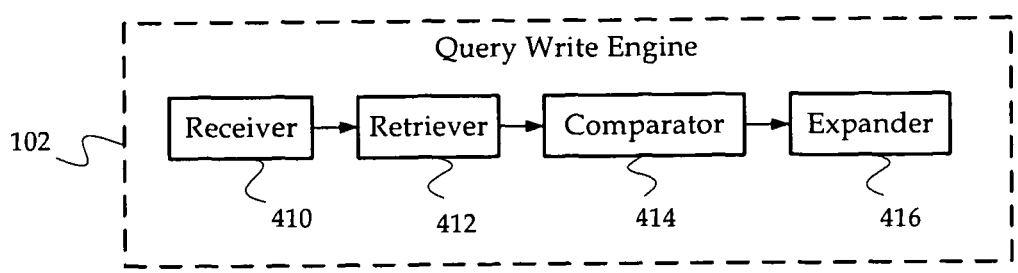
FIG. 4 is a block diagram of an alternative query write engine.

FIG. 4 is a block diagram of an alternative query write engine 102. As illustrated, the query write engine 102 may utilize the query feature index 128 for expanding received rare queries. The query write engine 102 may be a common component with the search engine 110 and/or the ad server 120. Accordingly, the search engine 110 may be in communication, or coupled, with the query feature index 128 for executing such expansions. The query write engine 102 may include a receiver 410, a retriever 412, a comparator 414, and an expander 416.

The receiver 410 may receive a user query from the search engine 110, which may receive the user query from the client device 108, and extract features from the query in a manner similar to that discussed above with respect to the query feature index 128. The retriever 412 may then retrieve a plurality of expanded queries within the query feature index 128 having mapped features corresponding to features of the received query. More specifically, the unigram, phrase, and class features extracted from the original query act as a pseudo-query made up of features rather than terms. This pseudo-query is then run against the query feature index 128 of queries that have been expanded and pre-processed offline. The comparator 414 may work in conjunction with the retriever 412 to make algorithmic-based comparisons between the features of the expanded queries and those of the received query, which will be discussed in more detail below. Finally, the expander 416 may use the closest retrieved expanded queries from the query feature index 128 to algorithmically expand the receive query into one more suited for submission to an ad selection module (FIG. 5).

The retriever 412 employs a vector space-based retrieval approach for retrieving related queries. Within the vector space model, queries and documents are represented as high dimensional vectors. Each vector dimension typically corresponds to a single term, or, in the present embodiments, a feature, such as a unigram, phrase, or a semantic class. In the system 100, features from the original query are weighted as follows:

$$w(f, Q) = (1 + \log \#(f, Q)) \cdot idf(f) \quad (1)$$

where #(f, Q) is the number of times feature f occurs in query Q and idf(f) is the inverse document frequency for feature f. Here, idf(f) captures the global importance of a feature. It is computed as $$idf(f) = \log \frac{N}{N_f}$$

where N is the total number of ads in the corpus and $N_f$ is the number of ads that feature f occurs in. Although idf is computed based on the ad corpus, it is also possible to compute it based on a query log or a large sample of documents from the Web. Under this weighting, terms that occur in the query, and are relatively rare in the ad corpus, are given the highest weights, whereas more frequent terms, such as "the" are given considerably lower weights.

The weights for the expanded queries that are stored in the query feature index 128 are computed in a similar manner. However, since the queries in the query feature index 128 are expanded, offline, with web search results, the weights associated with them have been aggregated over a set of web search results. In this representation, features are weighted as follows:

$$w(f, E(Q)) = \left(1 + \log \sum_{D \in Results(Q)} \#(f, D)\right) \cdot idf(f) \quad (2)$$

where E(Q) is the web-expanded version of Q, Results(Q) is the set of top web search results for query Q, #(f, D) is the number of times that feature f occurs in search result D, and idf(f) is computed based on the ad corpus. In practice, the top 40 search results from the Yahoo! search engine are retrieved and only the 50 highest weighted unigrams, 50 highest weighted phrases, and 5 highest weighted classes are considered for each query when building the inverted index 128. This feature pruning is done to reduce the size of the inverted index 128 and minimize the number of noisy or non-useful features.

For the web query and expanded query vectors, the vectors may be normalized to length one (1) under an $l_2$ norm. However, rather than normalize vectors across feature types, the query write engine 102 only normalizes within given feature types. That is, the sub-vector of unigram features is ensured to have length 1, and similarly for phrase and semantic class features. Although queries are represented as single vectors, they can be conceptualized as three normalized vectors, one corresponding to each feature type.

The similarity between two vectors, with respect to a given feature type F, may be defined as:

$$sim_F(X, Y) = \sum_{f \in F(X) \cap F(Y)} w(f, X) \cdot w(f, Y) \quad (3)$$

where F specifies a feature type and F(X) is the set of features extracted from X of type F. For example, if $F_u$ is the set of unigram features, then $F_u(X)$ is the set of unigram features extracted from X. Thus, $F(X) \cap F(Y)$ is the set of features of type F that occur (i.e., have non-zero weight) in both X and Y. Note that $sim_F(X, Y)$ is just the dot product between features of type F in X and features of type F in Y.

In order to produce a final (similarity) score, the per-feature type similarities are combined via a simple weighted sum. Hence, the scoring function has the following form:

$$sim(Q, E(Q')) = \sum_{F \in (F_u, F_p, F_c)} \lambda_F \cdot sim_F(Q, E(Q')) \quad (4)$$

where E(Q') is the web-expanded representation of Q', $F_u$, $F_p$, and $F_e$ are the sets of unigram, phrase, and class features, and $\lambda_F$ signifies the weight associated with each set. Furthermore, in the computation of $sim_F(Q, E(Q'))$, w(J, Q) and w(J, E(Q')) are defined according to Equations 1 and 2, respectively. Thus, the scoring function first computes a dot product for each feature type between the original query and the offline expanded query. The dot products are then combined via a weighted sum (weighted according to $\lambda_F$). This formulation provides flexibility of assigning different weights to the unigram, phrase, and semantic class feature types, based on the confidence had in the sources of the external knowledge, such as from a query classifier and/or a phrase extractor.

One issue that can arise from this type of scoring is that the unigram, phrase and class feature vectors could vary in length and thus their normalized components can have different relative impact. For example, as the class vector is of length 3, the components of this vector would have much higher values than the components of the unigram vector that is of length 50 in the experimental setup. This vector length difference is mitigated by taking the vector lengths in account when choosing the $\lambda_F$ parameters.

Using the ranking algorithm of Equation 4, a ranked list of queries are retrieved that have been processed offline that are related to the incoming (rare) query. As will be shown, these queries can be used to construct an enriched (or expanded) representation of the original query. The expander 416 will construct an expanded version (Q*) of the rare query after the most related queries have been retrieved. There are many ways to construct Q*. However, since the queries are generally being worked with within the vector space model, Rocchio's query expansion algorithm is known to be effective. J. J. Rocchio, "Relevance Feedback in Information Retrieval," Prentice-Hall, pages 313-323, 1971.

Given the original query, represented as a feature vector, and a set of related queries, each also represented as feature vectors, Rocchio's algorithm shifts the original query vector towards the centroid of the related query vectors. This is a form of pseudo-relevance feedback, where it is assumed that the related query vectors are relevant and the algorithm tries to push the original query vector in their general direction. This process can be described mathematically as:

$$w(f, Q^*) = (1-\lambda) \cdot w(f, Q) + \lambda \sum_{Q' \in Related(Q)} \frac{w(f, Q')}{|Related(Q)|} \quad (5)$$

where w(f Q*) is the weight of feature f in the expanded query vector, Related(Q) is the set of related queries retrieved using Equation 4, |Related(Q)| is the number of related queries retrieved, w(f Q') is the weight of feature f with respect to Q', and $\lambda$ is a free parameter that allows for control of the weighting between the original query and the centroid of related queries.

There are differences between the above approach and standard query expansion using pseudo-relevance feedback. First, the above approach expands against a small, specialized database of queries, rather than a potentially large, general purpose database (e.g., web search). As will be shown, this can be done very efficiently, unlike querying the Web, which would have to be done offline. Second, rather than expanding using documents directly (query→document→expanded query), the disclosed method expands using the search results of related queries (query→related queries→documents→expanded query). This additional level of indirection results in a more diverse set of expansion terms. Since the mapping from related queries to documents has been done offline, the only cost incurred is a lookup, as opposed to the cost of parsing, weight computation, sorting, etc. The end result of the process is an efficient online approximation to standard, inefficient, query expansion approaches.

FIG. 5 is a flow diagram showing the flow of data through the system 100 of FIG. 1 as per (offline) pre-processing and online processing to enable expansion of the received rare query. At block 502, a large number of queries are pre-processed offline to build the query feature index 128 as discussed above and with reference to block 202 of FIG. 2. The queries may be retrieved from the search log database 116. At block 504, the query feature index 128 may be utilized when a query is received to generate an expanded query as a substitute to the received query, while online, corresponding to block 204 of FIG. 2.

At block 506, web pages from web search results of each query are retrieved, along with query logs at block 508, and click log data at block 510. At block 512, each query from the large number of queries is expanded by the expander 306 based on features extracted by the extractor 304. The indexer 308 then builds the query feature index 128 by indexing the extracted features with reference to the expanded queries, thereby creating inverse mapping when compared with the lookup table 104. For a simple example, suppose the lookup table contained entries apple and orange, respectively mapped to (1) fruit, macbook, vitamins; and (2) vitamins, citrus, and fruit. If extracted features for previous queries related to apple and orange included these same terms—such as unigrams, for instance—then the inverted (or query feature) index 128 would include the entries and mappings shown in Table 2.

TABLE 2

| Entries (features) | Mapped Query Terms |
|---|---|
| fruit | apple, orange |
| macbook | apple |
| vitamins | apple, orange |
| citrus | orange |

At block 520, a user query is received by the search engine 110, which then looks up the query in the lookup table 104. If the received query is found in the lookup table 104, corresponding advertisements are selected at block 524, which may represent an ad selection module that may also be a component of the ad write engine 102. Further to the above example, suppose the query is "citrus fruit," and just for purposes of the example, suppose the lookup table 104 does not include the term "citrus fruit." The write query engine 102 may then run "citrus" and "fruit" and "citrus fruit" against the query feature index 128. These terms will quickly return "orange" and "apple" as related to the query, although "orange" is more related. At block 528, the lookup table 104 may then be used again to quickly get the expanded representations of "orange" and "apple," which enable the formation, in real time, of an expanded query for "citrus fruit." Additional algorithmic processes may be executed on entries of the query feature index 128 to produce an expanded query based documents retrieved from the related queries found in therein. The expanded query generated at block 528 may be referred to as an ad query, which may then be used at block 524 to select advertisements corresponding thereto for delivery to the user. At block 530, the selected advertisements are then displayed to the user.

The selection of the advertisements (ads) at block 524 may involve additional algorithmic matching, based on the features of the expanded user query and features of the potential advertisements to be displayed. In one embodiment, advertisements are scored with respect to the expanded version of a rare query. The approach is similar to how related queries were scored, with a few slight deviations to account for the unique characteristics of advertisements.

In order to overcome the shortness of the ads and allow for more information in the matching process, an entire ad group is employed as a retrieval unit, with all of the bid phrases attached to it. While examining the tradeoffs of this indexing scheme is beyond the scope of this paper, the scheme is explained here because it impacts how ad features are weighted.

The weighting scheme used to weight queries is not appropriate for weighting ads. Ads have different characteristics and may be treated differently. As just explained, ad indexing supports multiple bid phrases per creative. Advertisements for large advertisers may contain hundreds of bid phrases, while other ads may only have a single bid phrase. Therefore, ad lengths have a high variance with respect to the number of unigram, phrase, and class features extracted therefrom. Using standard $l_2$ vector normalization in these cases will cause short ads to be preferred over long ads, which is undesirable. For this reason, ad features are weighted using the BM25 weighting scheme, which robustly handles document length normalization and term frequency saturation. S. Robertson and S. Walker, "Some simple effective approximations to the 2-poisson model for probabilistic weighted retrieval," *Proc. 17th Ann. Intl. ACM SIGIR Conf. on Research and Development in Information Retrieval*, pages 232-241, 1994; S. Robertson, S. Walker, S. Jones, M. M. Hancock-Beaulieu, and M. Gatford, "Okapi at TREC-3," *Proc. 3rd Text Retrieval Conference*, pages 109-126, 1994. The specific form of BM25 weighting used is:

$$w(f, A) = \frac{(k+1) \cdot \#(f, A)}{k \cdot \left( (1-b) + b \cdot \frac{|A|}{|A|_{avg}} \right) + \#(f, A)} \cdot idf(f) \quad (6)$$

where $|A|$ is the length of the ad, $|A|_{avg}$ is the average ad length, and $\#w(f, A)$ is a weighted count of the number of times that feature f occurs in ad A. Occurrences are weighted according to which section of the ad they occur in, with bid phrase and title occurrences being weighted higher than description and display URL occurrences. In addition, k and b are free parameters that control for term frequency saturation and document length normalization, respectively. As before, idf(f) is computed over the entire ad corpus.

Another unique characteristic of ads is their structure. For this reason, the score of ads that have titles that match the query well may be increased. To achieve this, the following boost factor may be employed:

$$prox_F(Q, A) = \frac{\sqrt{\sum_{f \in F(T)} w(f, Q) \cdot w(f, A)}}{\sqrt{\sum_{f \in F(Q)} w(f, Q)^2}} \quad (7)$$

where F(T) are the features of type F extracted from the title. For example, $F_u(T)$ and $F_p(T)$ are the unigram and phrase features extracted from the title. This boost factor acts as a rudimentary form of term proximity that considers query feature co-occurrences in the title. This serves as a good proximity score approximation, given that no feature position information is stored in the inverted index 128. Since there is interest only in matching the text of the titles, $prox_{F_c}(Q, A)$ is defined as the title match boost for the semantic class features, to be zero (0).

The final ad scoring function is a weighted sum of dot products between feature types along with the title match boost. More formally, the scoring function is:

$$S(Q, Q^*, A) = \sum_{F \in \{F_u, F_p, F_c\}} \lambda_F \cdot sim_F(Q^*, A) \cdot (1 + prox_F(Q, A)) \quad (8)$$

where Q is the original query and Q* is the expanded query. Notice that the scoring function takes both the original query and the expanded query as arguments. This is necessary because the title match boost is based on the original query features, not the expanded query features.

Under this scoring function, the best ads are those that have many (highly weighted) features in common with the expanded query Q* and have a title that exactly matches the original query Q.

Figure 6:
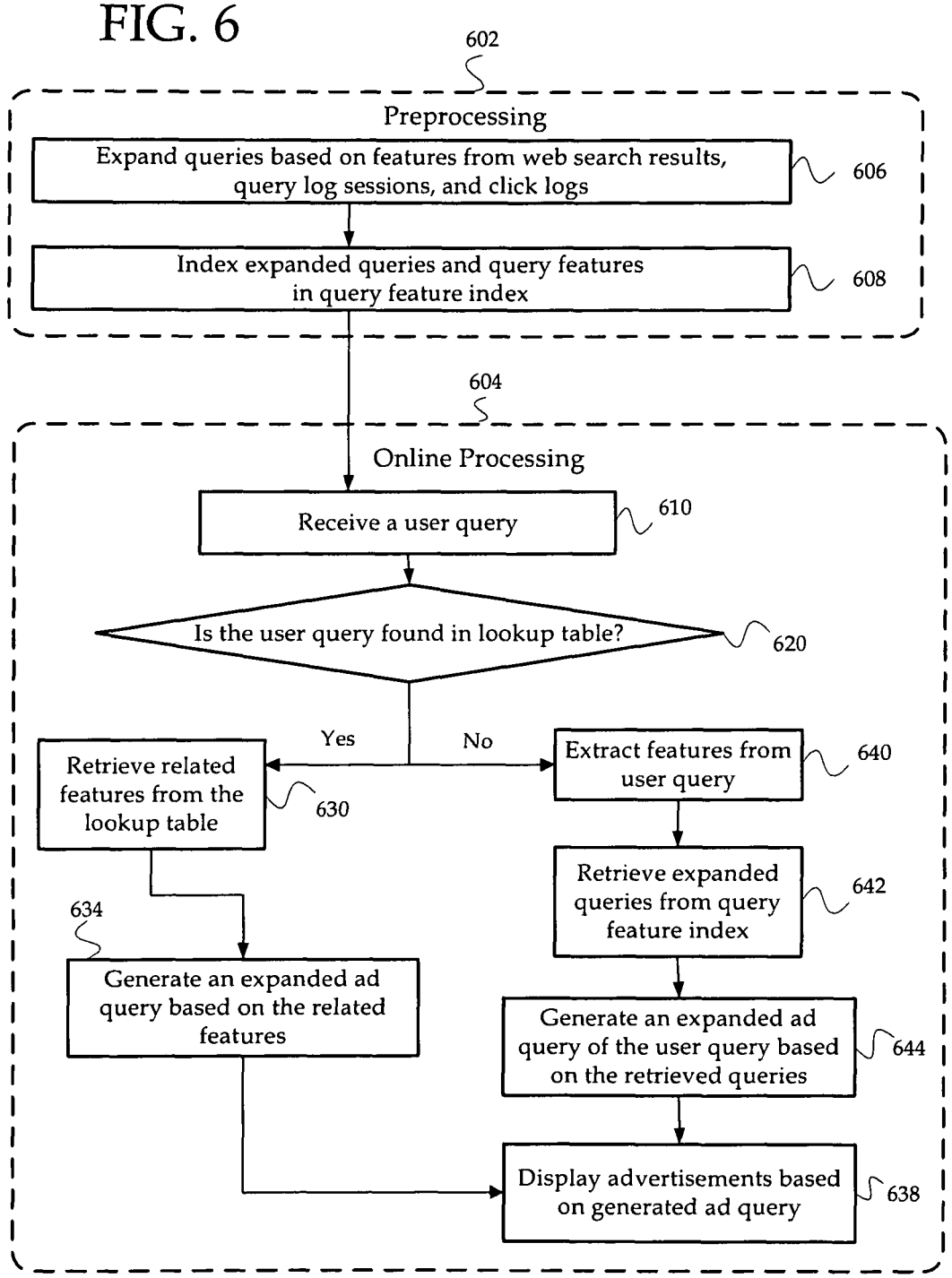
FIG. 6 is a flow diagram of a method for expansion of rare queries to improve ad matching according to an embodiment disclosed herein.

FIG. 6 is a flow diagram of a method for expansion of rare queries to improve ad matching according to an embodiment disclosed herein. At block 602, a large number of queries are pre-processed offline to build the query feature index 128 as discussed above and with reference to block 202 of FIG. 2. The queries may be retrieved from the search log database 116. At block 604, the query feature index 128 may be utilized when a query is received to generate an expanded query as a substitute to the received query, while online, corresponding to block 204 of FIG. 2.

At block 606, the system 100 expands queries based on features from web search results, query log sessions, and click logs. At block 608, the system 100 indexes expanded queries and query features in the query feature index 128, thus populating the query feature index 128 for use in online processing.

At block 610, a user query is received. At block 620, it is determined whether or not the user query is located in the lookup table 104. If it is, at block 630, the system 100 retrieves related features from the lookup table 104. A block 634, it generates an expanded ad query based on the related features retrieved from the lookup table 104. At block 638, it displays advertisements based on the generated ad query and in response to the user query.

If the user query is not found in the lookup table 104, at block 640, the system 100 extracts features from the user query as discussed above. At block 642, it retrieves one or more of the closest matching—in terms of features—of the expanded queries from the query feature index 128. At block 644, the system 100 generates an expanded ad query of the user query based on the retrieved queries, as discussed above. Finally, at block 638, the system 100 displays advertisements to a browser of the user based on the generated ad query.

Empirical Evaluation

Now is discussed the results of empirical evaluation of ad matching strategies for tail queries. The offline, pre-processed query lookup table 104 includes 100 million queries. The set was composed as an union of the top eight (8) deciles of the queries submitted to the U.S. Yahoo! search engine by volume and the queries that have been used as bid phrases in Yahoo!'s textual ad corpus.

For evaluation purposes, a set of 400 rare queries were randomly sampled from the web search query logs, such as from database 116. Of these, 121 rare queries were found in the look up table 104 while the remaining 179 were not. This way of sampling queries was chosen so that the usefulness of rare queries being found in the lookup table 104 could be evaluated versus the online expansion approach disclosed herein.

For each query, human editors judged the relevance of the top three (3) ads returned using several variants of the disclosed proposed ad matching algorithms, resulting in a total of 3,556 judgments. Editors labeled the relevance of each ad with respect to a given query on an integral scale from 1 to 5, with a rating of one (1) corresponding to a highly attractive ad and a rating of five (5) corresponding to a poor ad. The collection of ads against which queries were matched queries included the entire Yahoo! textual ad corpus, such as could be stored in the ad database 124.

To evaluate the quality of the proposed ad matching algorithms, discounted cumulative gain (DCG) and precision-recall curves were employed. The DCG metric is commonly used to evaluate ranking algorithms when there are graded relevance judgments. Since the judgments in the experiments are on a scale of 1 to 5, this metric is an appropriate choice. The DCG for a single query is defined as as follows:

$$DCG@K(Q) = \sum_{i=1}^{K} \frac{g(i)}{\log(1+i)} \quad (9)$$

where g(i) is the gain associated with the rating of result at rank i, and K is maximum depth result to consider. Each gain is discounted, giving less weight to relevant items that appear farther down the ranked list, so the ordering of the results may be important. The (arithmetic) average of the per-query DCG@K values, also known as mean DCG@k is used to evaluate an algorithm for an entire set of queries. Since three ads per query are retrieved, the algorithms are primarily evaluated according to mean DCG@1, DCG@2, and DCG@3. For the experiments, gain values of 10, 7, 3, 0.5, and 0 are used for judgment grades 1, 2, 3, 4, and 5, respectively.

In addition to DCG, precision-recall curves are considered that allow visualization of the tradeoff between recall, a fraction of relevant results returned, and precision, a fraction of results returned that are relevant. Since precision and recall are defined for binary judgments, the judgment grades should be binarized. For these experiments, judgment grades 1, 2, and 3 are assumed to be relevant, while grades 4 and 5 are assumed to be non-relevant. Furthermore, since only three ads per query are retrieved, plotting classical 11-point interpolated macroaveraged curves makes little sense. Instead, interpolated microaveraged curves are plotted. See R. A. Baeza-Yates and B. Ribeiro-Neto, *Modern Information Retrieval*, Addison-Wesley Longman Publishing Co., Inc., Boston, Mass., USA, 1999.

To be rigorous, whether the difference observed between two algorithms is statistically significant or not is tested. A paired, one-tailed non-parametric bootstrap test was used for this purpose. See R. Jones, B. Rey, O. Madani, and W. Greiner, "Generating query substitutions," *Proc. 15th Intl. Conf on World Wide Web*, pages 387-396, New York, N.Y., 2006 (ACM). The dagger (†) and double dagger (‡) represent significant improvements with respect to the baseline at the p<0.05 and p<0.10 levels, respectively.

The retrieval quality of the enclosed, proposed ad matching algorithms are now evaluated. The evaluation is divided into three parts: (1) evaluate queries that are not found in the lookup table 104 of pre-processed queries; (2) show how effective the disclosed method is for queries that are found in the lookup table 104; and (3) show that the disclosed method can consistently and significantly improve retrieval quality across the entire spectrum of tail queries by using a hybrid online and offline expansion approach.

Four different ad matching algorithms are evaluated, each of which corresponds to a different possible path through the system architecture shown in FIGS. 1 and 5. The first algorithm is "Baseline," which ranks results using the original, unexpanded version of the query vector. The second algorithm, "Offline Expansion," looks the query up in the lookup table 104 and runs the expanded version of the query, if it exists. Otherwise, it simply uses the original, unexpanded query vector. The third algorithm is "Online Expansion," which corresponds to the proposed algorithm for expanding queries online using offline processing. The details of the algorithm were described in detail above. For this algorithm, the original query is expanded with 3 related queries from the inverted index 128. Finally, the last algorithm is referred to as "Online+Offline Expansion." As the name suggests, it is a combination of the Online Expansion and Offline Expansion approaches. The algorithm forms an ad vector from a weighted combination of the Online Expansion ad vector and the Offline Expansion ad vector. In the experiments using this algorithm, the Online Expansion ad vector is given a weigh of one (1) and the Offline Expansion ad vector a weight of two (2).

Furthermore, in all of the experiments, $\lambda_{Fu}$, $\lambda_{Fp}$, and $\lambda_{Fc}$, the unigram, phrase, and class feature weights are set to 1, 1, and 0.1, respectively.

TABLE 3

|  | Baseline | Online Expansion |
|---|---|---|
| DCG@1 | 0.99 | 1.07 (+8.1%)† |
| DCG@2 | 1.57 | 1.66 (+5.7%)† |
| DCG@3 | 1.97 | 2.10 (+6.6%)‡ |

Table 3 includes a comparison of ad matching effectiveness for tail queries not found in the pre-processed lookup table 104. The primary evaluation concerns those queries that are not found in the lookup table of offline processed queries. These are the queries that one would like to expand, online, to improve the quality of ad matches. For this purpose, the effectiveness of the Baseline and Online Expansion algorithms are compared. The baseline appears reasonable and appropriate because the queries that are not found in the lookup table 104 are very rare and there is little that can be done using existing query expansion techniques on these queries, especially online, in real-time.

Figure 7:
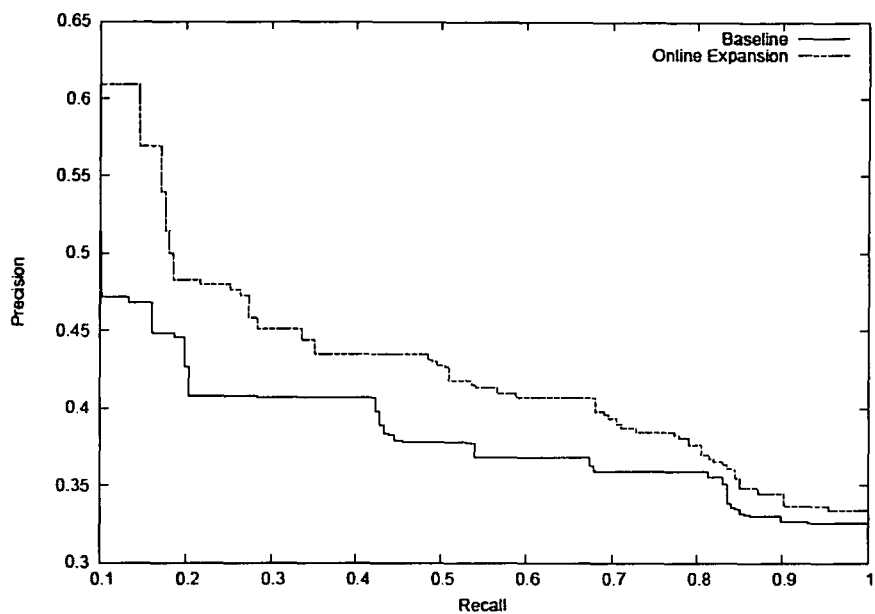
FIG. 7 is a graph of an interpolated precision-recall curve for tail queries not found in the pre-processed table.

The results of this evaluation are given in Table 3 and FIG. 7. FIG. 7 is a graph of an interpolated precision recall curve for tail queries not found in the pre-processed table. First, the DCG results in Table 3 show that the Online Expansion algorithm consistently and significantly improves DCG@1, DCG@2, and DCG@3. Indeed, the Online Expansion improves DCG@1 by over 8%. The precision-recall curves in FIG. 7 show similar results, with the Online Expansion curve dominating the Baseline curve at all levels of recall. This is an important characteristic, because practical systems often aim for recall levels well below 100% in order to produce higher quality ads. These results show that the Online Expansion technique is more effective than the Baseline regardless of the level of recall, making it very useful from a practical point of view. These results clearly show that ability to effectively and efficiently enrich tail queries by leveraging large-scale offline processing.

Note that the absolute DCG values for these queries are somewhat low, primarily due to the very nature of the queries under consideration. However, it may be possible to use automatic classification techniques, such as the one recently proposed by Broder et al. to determine the quality of a given set of ads. A. Broder, M. Ciaramita, M. Fontoura, E. Gabrilovich, V. Josifovski, D. Metzler, V. Murdock, and V. Plachouras, "To swing or not to swing: Learning when (not) to advertise,"

*Proc 17th. Inti. Conf on Information and Knowledge Management,* 2008. Such methods can be used to improve overall ad quality and reduce the number of times ads are shown for queries with embarrassingly low DCG.

TABLE 4

|  | DCG@1 | DCG@2 | DCG@3 |
|---|---|---|---|
| Baseline | 2.89 | 4.56 | 5.75 |
| Online Expansion | 2.83 | 4.43 | 5.54 |
| Offline Expansion | 3.07‡ | 4.75 | 5.87 |
| Online + Offline Expansion | 2.91 | 4.44 | 5.59 |

Figure 8:
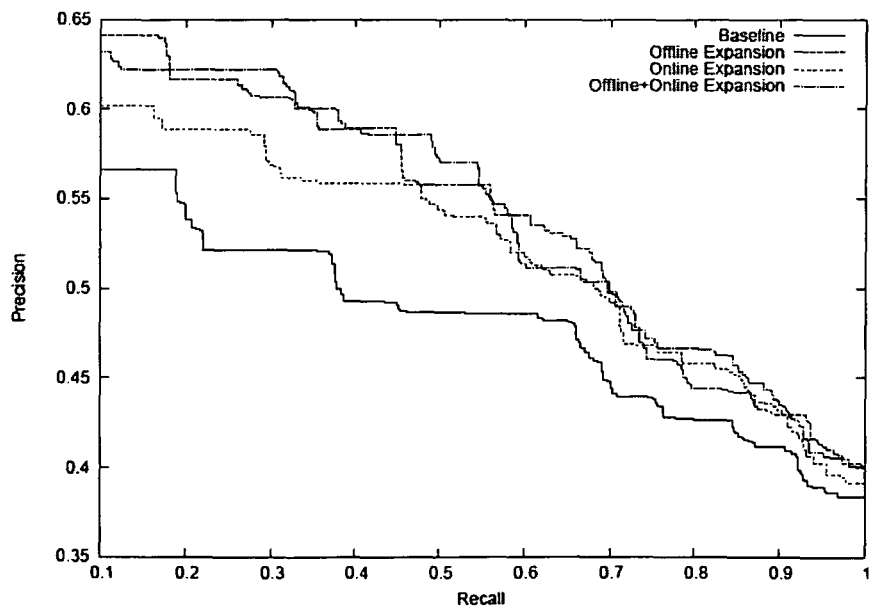
FIG. 8 is a graph of an interpolated precision-recall curve for tail queries found in the pre-processed lookup table.

Table 4 is a comparison of ad matching effectiveness for tail queries found in the pre-processed lookup table 104. Next, the effectiveness is evaluated of the Baseline, Online Expansion, Offline Expansion, and Online+Offline Expansion approaches on the set of tail queries that are found in the lookup table 104. The results of the evaluation are shown in Table 4 and FIG. 8. FIG. 8 is a graph of an interpolated precision-recall curve for tail queries found in the pre-processed lookup table 104.

The first thing to notice is that the Offline Expansion approach is consistently better than the other approaches in terms of DCG. This result is not unexpected, however, because offline expansion is expected to be superior to online expansion. The proposed online expansion approach is really a last resort algorithm that should only be applied to queries that are not found in the lookup table 104. Thus, since online expansion is really just an approximation for the offline expansion, it is expected to produce better results for queries in the lookup table 104. The results also show that the combined method, Online+Offline Expansion, is slightly worse than Offline Expansion, but the difference is not statistically significant. Finally, it is interesting to note that the Offline Expansion approach is only significantly better than the Baseline in terms of DCG@1. This is likely due to the fact that the Offline Expansion approach was largely tuned for head and torso queries, and since the evaluation is only done over tail queries, the approach ends up being consistently better than the baseline, but not always significantly better.

The precision-recall curve in FIG. 8 clearly shows that the Baseline and Online Expansion approaches are inferior to the Online+Offline Expansion and Offline Expansion approaches. Despite the DCG results, the precision-recall curves suggest that the difference between the Online Expansion and Online+Offline Expansion approaches is not very large. The results for tail queries found in the lookup table 104 therefore suggest that using Offline Expansion is the best strategy and that the Online+Offline Expansion approach is also a valid option.

Now described is how to put together a highly effective, efficient sponsored search ad matching algorithm for tail queries. Results up until this point have suggested the Online Expansion approach works the best for tail queries not found in the lookup table 104 and the Offline Expansion approach is the most effective for the tail queries that do happen to appear in the lookup table 104. Given this, a Hybrid approach is proposed that combines the Online Expansion and Offline Expansion methods. The Hybrid approach is very simple, yet, as will be shown, very effective as well. Under the approach, queries that are found in the lookup table 104 are processed using the Offline Expansion method, whereas queries that are not found in the lookup table 104 are processed using the Online Expansion method. Since both of these approaches can be done online, the Hybrid method can also be implemented very efficiently. The underlying rationale behind this approach is to combine the best ranking approaches for both of the query types into a superior ranking function.

TABLE 5

|  | DCG@1 | DCG@2 | DCG@3 |
|---|---|---|---|
| Baseline | 1.61 | 2.58 | 3.23 |
| Online Expansion | 1.71‡ | 2.68 | 3.32 |
| Offline Expansion | 1.66 | 2.63 | 3.25 |
| Online + Offline Expansion | 1.76‡ | 2.69 | 3.37 |
| Hybrid | 1.79† | 2.78† | 3.43† |

Table 5 shows comparison of ad matching effectiveness for all tail queries. The effectiveness is evaluated of the Baseline, Online Expansion, Offline Expansion, Online+Offline Expansion, and Hybrid approaches across the entire set of tail queries in Table 5. The results show that the Online Expansion and Online+Offline Expansion approaches are significantly better than the Baseline according to DCG@1. However, the clearly superior approach for handling all tail queries is the Hybrid approach, which improves over the Baseline by 11.2%, 7.8%, and 6.2% in terms of DCG@1, DCG@2, and DCG@3, respectively. The improvements of the Hybrid approach over the Online+Offline Expansion approach for the same metrics are 1.7%, 3.3% (t), and 1.8%, respectively. Thus, even though the goal was to develop an effective ad matching algorithm for tail queries not found in the lookup table 104, the proposed Hybrid approach shows consistent and significant improvements in DCG across the entire spectrum of tail queries.

TABLE 6

| Characteristic | Percentage |
|---|---|
| Misspelled | 21% |
| Domain/URL | 18% |
| Proper name | 14% |
| Foreign | 10% |

To develop a better understanding of rare queries and to help improve the performance of the system 100, a large set of rare queries were analyzed to find out the most common cause of mismatched ads. Table 6 lists the most common classes of characteristics observed and a percentage of the time they were found in rare queries. Over a fifth of the tail queries contained at least one misspelled word. For the experiments, a the web search spell correction tool was used to correct the spelling of the queries. The results reported in the section are post spelling correction for both the examined methods and the baseline.

Although the queries were selected from the United States query logs, there were still around 10% of foreign queries, which were eliminated from the evaluation. Another common type of a rare query include uniform resource locators (URLs), as for example when the user types "sendpictureshome.com." Such queries can be processed by parsing the URL and extracting features. As these were not the focus of the evaluation, however, the URL was used as a single feature. Also noted was that a significant portion (14%) of the rare queries contained proper names of people, places or organizations.

Figure 9:
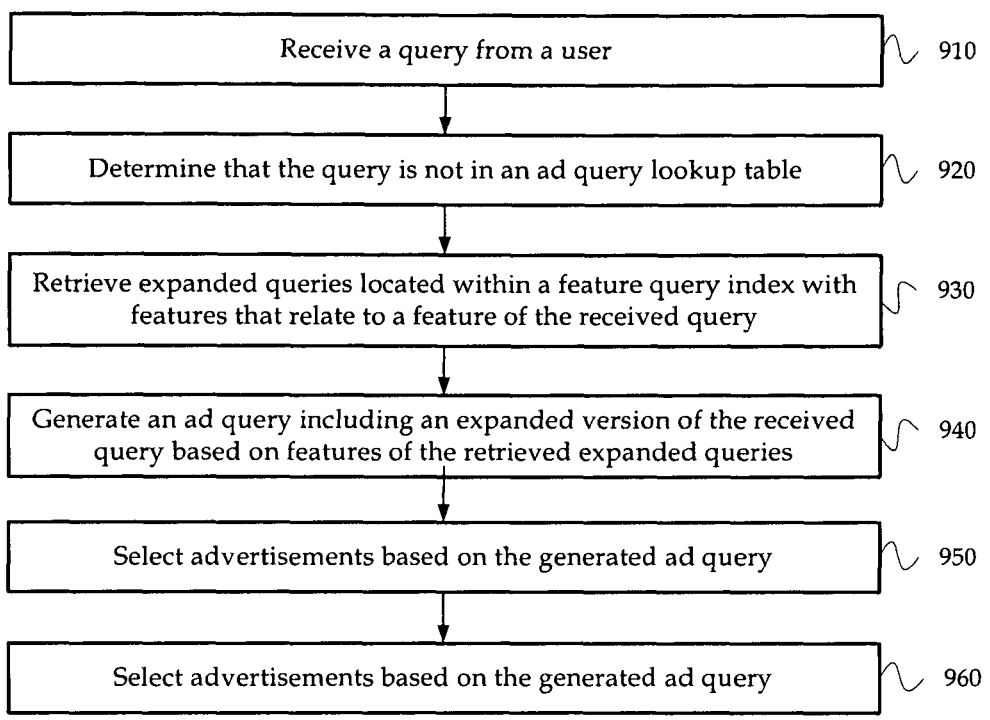
FIG. 9 is a flow diagram of a method for expansion of rare queries to improve ad matching according to another embodiment.

FIG. 9 is a flow diagram of a method for expansion of rare queries to improve ad matching according to another embodiment. At block 910, a query is received from a user by a search engine. At block 920, it is determined that the query does not match an entry in an ad query lookup table, which is stored in data storage of the search engine. At block 930, retrieved are one or more expanded queries located within a query feature index whose features relate to one or more features of the received query. The query feature index is stored in a database of the data storage and includes a plurality of expanded queries. At block 940, the search engine generates, in real time, an ad query including an expanded version of the received query based on features of the retrieved expanded queries. At block 950, one or more advertisements are selected based on the generated ad query. At block 960, the one or more advertisements are displayed to the user in response to the query received from the user.

The system and process described may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A computer-implemented method for expansion of rare queries to improve advertisement results, the method comprising:
 receiving a query from a user by a search engine;
 determining that the query does not match an entry in an ad query lookup table stored in data storage of the search engine;
 retrieving one or more expanded queries located within a query feature index whose features relate to one or more features of the received query, wherein the query feature index is stored in a database of the data storage and comprises a plurality of expanded queries;
 wherein retrieving comprises:
  representing the features as vectors;
  weighting the vectors of the received query based on a number of times corresponding respective features occur in the query and on an inverse document frequency for corresponding respective features in an ad corpus, to more heavily weight the rare queries; and
  using a vector space-based retrieval approach for retrieving the expanded queries;
 generating, in real time and by the search engine, an ad query comprising an expanded version of the received query based on features of the retrieved expanded queries; and
 selecting one or more advertisements based on the generated ad query, wherein the one or more advertisements are displayed to the user in response to the query received from the user.

2. The method of claim 1, wherein the expanded queries stored in the query feature index comprise commercial queries, the method further comprising:
 mapping, offline, the related expanded queries within the query feature index with features of their respective web search results and query logs sessions.

3. The method of claim 1, wherein features of the received and expanded queries comprise one or more of unigrams, phrases, and semantic classes.

4. The method of claim 1, wherein weighting the vectors comprises weighting the features of the received query with $w(f, Q) = (1 + \log \#(f, Q)) \cdot idf(f)$, where $\#(f, Q)$ comprises a number of times feature f occurs in query Q and $idf(f)$ comprises an inverse document frequency for feature f in an ad corpus, further comprising: weighting the features of the expanded queries (Q') stored in the query feature index with $$w(f, E(Q')) = \left(1 + \log \sum_{D \in Results(Q')} \#(f, D)\right) \cdot idf(f),$$

where E(Q') comprises the search results-expanded version of query Q', Results(Q') comprises a set of top search results for query Q', and $\#(f, D)$ comprises a number of times that feature f occurs in search result D.

5. The method of claim 4, further comprising:
normalizing, under an $l_2$ norm, the vectors of the received and expanded queries to a predetermined length within each feature type.

6. The method of claim 4, further comprising:
computing a score for an expanded query in the query feature index when compared with the received query based on a weighted sum of levels of similarities per each feature, wherein the levels of similarities are computed using the weightings of the features of the expanded and received queries.

7. The method of claim 6, wherein the levels of similarities are computed using a dot product between weighted features in the expanded query with weighted features in the received query.

8. The method of claim 7, wherein the dot product comprises:

$$sim(Q, E(Q')) = \sum_{F \in (F_u, F_p, F_c)} \lambda_F \cdot sim_F(Q, E(Q')),$$

where $E(Q')$ comprises the search results-expanded representation of $Q'$, $F_u$, $F_p$, and $F_c$ comprise sets of unigram, phrase, and semantic class features, respectively, and $\lambda_F$ comprises a weight associated with each set, wherein $$sim_F(Q, E(Q')) = \sum_{f \in F(Q) \cap F(E(Q'))} w(f, Q) \cdot w(f, E(Q')).$$

9. The method of claim 6, wherein selecting the one or more advertisements comprises, for each potentially-related advertisement for mutual comparison:
weighting ad features within the advertisement according to a weighting scheme to produce a weight for the advertisement;
increasing the weight of the advertisement if its title closely matches the received query; and
creating a final advertisement score based on a weighted sum of dot products between feature types of the expanded received query and those of the advertisement and any increased weight of the title of the advertisement.

10. A computer-implemented method for expansion of rare queries to improve advertisement results, the method comprising:
expanding, with a query write engine, a plurality of queries based on one or both of corresponding web search results and query log sessions;
building a query feature index, coupled with the query write engine, that maps the expanded plurality of queries to features extracted from the one or both of the corresponding web search results and the query log sessions;
receiving a query from a user by a search engine coupled with the query write engine;
determining that the query does not match an entry in an ad query lookup table stored in data storage of the search engine;
retrieving one or more expanded queries located within the query feature index whose features correspond to one or more features of the received query, wherein the expanded index is stored in a database of the data storage;
wherein retrieving comprises:
representing the features as vectors;
weighting the vectors of the received query based on a number of times corresponding respective features occur in the query and on an inverse document frequency for corresponding respective features in an ad corpus, to more heavily weight the rare queries; and
using a vector space-based retrieval approach for retrieving the expanded queries;
generating, in real time by the write engine, an ad query comprising an expanded version of the received query based on features of the retrieved expanded queries;
selecting one or more advertisements based on the generated ad query; and
displaying the one or more advertisements to the user in response to the query.

11. The method of claim 10, wherein features of the received and expanded queries comprise one or more of unigrams, phrases, and semantic classes, and wherein the plurality of queries are expanded additionally based on click log sessions.

12. The method of claim 11, further comprising:
normalizing, under an $l_2$ norm, the vectors of the received and expanded queries to a length of 1 (unity) within each feature type.

13. The method of claim 10, wherein weighting the vectors comprises weighting the features of the received query with $w(f, Q)=(1+\log \#(f, Q)) \cdot idf(f)$, where $\#(f, Q)$ comprises a number of times feature f occurs in query Q and $idf(f)$ comprises an inverse document frequency for feature f in an ad corpus, further comprising weighting the features of the expanded queries (Q') stored in the query feature index with $$w(f, E(Q')) = \left(1 + \log \sum_{D \in Results(Q')} \#(f, D)\right) \cdot idf(f),$$

where $E(Q')$ comprises the search results-expanded version of query $Q'$, $Results(Q')$ comprises a set of top search results for query $Q'$, and $\#(f, D)$ comprises a number of times that feature f occurs in search result D.

14. The method of claim 13, further comprising:
computing a score for an expanded query in the query feature index when compared with the received query based on a weighted sum of levels of similarities per each feature, wherein the levels of similarities are computed using the weightings of the features of the expanded and received queries.

15. The method of claim 14, wherein the levels of similarities are computed using a dot product between weighted features in the received query with weighted features in the expanded query comprising:

$$sim(Q, E(Q')) = \sum_{F \in (F_u, F_p, F_c)} \lambda_F \cdot sim_F(Q, E(Q')),$$

where $E(Q')$ comprises the search results-expanded representation of $Q'$, $F_u$, $F_p$, and $F_c$ comprise sets of unigram, phrase, and semantic class features, respectively, and $\lambda_F$ comprises a weight associated with each set, wherein $$sim_F(Q, E(Q')) = \sum_{f \in F(Q) \cap F(E(Q'))} w(f, Q) \cdot w(f, E(Q')).$$

16. The method of claim 15, further comprising:
selecting $\lambda_F$ for at least some of the features based on a confidence level in external knowledge derived regarding a query classifier and a phrase extractor.

17. The method of claim 15, wherein selecting the one or more advertisements comprises, for each potentially-related advertisement for mutual comparison:
weighting ad features within the advertisement according to a weighting scheme to produce a weight for the advertisement;
increasing the weight of the advertisement if its title closely matches the received query; and
creating a final advertisement score based on a weighted sum of dot products between feature types of the expanded received query and those of the advertisement and any increased weight of the title of the advertisement.

18. A computer-implemented system for expansion of rare queries to improve advertisement results, the system comprising:
a search engine for receipt of a query from a user, the search engine including a memory and a processor;
an ad lookup table stored in data storage coupled with the search engine, the ad lookup table linked to ads to be served in response to specific queries;
a query feature index coupled with the search engine comprising a plurality of expanded queries;
wherein the processor is configured to:
determine that the received query does not match an entry in the ad lookup table;
retrieve one or more expanded queries located within the query feature index whose features relate to one or more features of the received query, comprising:
representing the features as vectors;
weighting the vectors of the received query based on a number of times corresponding respective features occur in the query and on an inverse document frequency for corresponding respective features in an ad corpus, to more heavily weight the rare queries; and
using a vector space-based retrieval approach for retrieving the expanded queries;
generate, in real time, an ad query comprising an expanded version of the received query based on features of the retrieved expanded queries;
select one or more advertisements based on the generated ad query; and
serve the one or more advertisements to the user in response to the received query.

19. The system of claim 18, wherein the expanded queries stored in the query feature index comprise commercial queries, wherein the processor is further configured to:
map, offline, the related expanded queries within the query feature index with features of their respective web search results and query logs.

20. The system of claim 19, wherein features of the received and expanded queries comprise one or more of unigrams, phrases, and semantic classes.

21. The system of claim 18, wherein to weight the vectors, the processor is further configured to:
weight the features of the received query with $w(f, Q)=(1+ \log \#(f, Q)) \cdot idf(f)$, where $\#(f, Q)$ comprises a number of times feature f occurs in query Q and $idf(f)$ comprises an inverse document frequency for feature f in an ad corpus; and
weight the features of the expanded queries (Q') stored in the query feature index with $$w(f, E(Q')) = \left(1 + \log \sum_{D \in Results(Q')} \#(f, D)\right) \cdot idf(f),$$

where $E(Q')$ comprises the search results-expanded version of query Q', $Results(Q')$ comprises a set of top search results for query Q', and $\#(f, D)$ comprises a number of times that feature f occurs in search result D.

22. The system of claim 21, wherein the processor is further configured to:
normalizes, under an $l_2$ norm, the vectors of the received and expanded queries to a predetermined length within each feature type.

23. The system of claim 21, wherein the processor is further configured to:
compute a score for an expanded query in the query feature index when compared with the received query based on a weighted sum of levels of similarities per each feature, wherein the levels of similarities are computed using the weightings of the features of the expanded and received queries.

24. The system of claim 23, wherein the levels of similarities are computed using a dot product between weighted features in the expanded query with weighted features in the received query.

25. The system of claim 23, wherein for each potentially-related advertisement, for mutual comparison in the selection of the one or more advertisements, the processor is further configured to:
weight ad features within the advertisement according to a weighting scheme to produce a weight for the advertisement;
increase the weight of the advertisement if its title closely matches the received query; and
create a final advertisement score based on a weighted sum of dot products between feature types of the expanded received query and those of the advertisement and any increased weight of the title of the advertisement.

* * * * *